(12) United States Patent
Pierre et al.

(10) Patent No.: US 12,260,392 B2
(45) Date of Patent: Mar. 25, 2025

(54) SYSTEM, METHOD, AND COMPUTER PROGRAM PRODUCT FOR VERIFYING A CARD IMAGE

(71) Applicant: Visa International Service Association, San Francisco, CA (US)

(72) Inventors: Alexandre Pierre, San Mateo, CA (US); Carl Smith, Elk Grove, CA (US); Kiat Chun Tan, Singapore (SG); Baoxiang Kang, Singapore (SG); Li Huang, Singapore (SG); Yuexi Chen, Foster City, CA (US)

(73) Assignee: Visa International Service Association, San Francisco, CA (US)

( * ) Notice: Subject to any disclaimer, the term of this patent is extended or adjusted under 35 U.S.C. 154(b) by 115 days.

(21) Appl. No.: 17/642,963

(22) PCT Filed: Sep. 15, 2020

(86) PCT No.: PCT/US2020/050863
§ 371 (c)(1),
(2) Date: Mar. 15, 2022

(87) PCT Pub. No.: WO2021/055348
PCT Pub. Date: Mar. 25, 2021

(65) Prior Publication Data
US 2022/0318786 A1    Oct. 6, 2022

Related U.S. Application Data

(60) Provisional application No. 62/900,870, filed on Sep. 16, 2019.

(51) Int. Cl.
*G06Q 20/34* (2012.01)
*G06Q 20/40* (2012.01)

(52) U.S. Cl.
CPC ......... *G06Q 20/351* (2013.01); *G06Q 20/401* (2013.01)

(58) Field of Classification Search
CPC .... G06Q 20/351; G06Q 20/401; G06Q 20/20; G06Q 20/34; G06Q 30/0185; G06Q 20/40; G07F 7/10
See application file for complete search history.

(56) References Cited

U.S. PATENT DOCUMENTS

| 5,321,751 | A  | 6/1994  | Ray et al. |
| 7,127,649 | B2 | 10/2006 | Leaming    |
| (Continued) |

FOREIGN PATENT DOCUMENTS

| EP | 3629150 A1    | 4/2020 |
| WO | 2018144036 A1 | 8/2018 |

OTHER PUBLICATIONS

Lopez-Rojas et al., "BankSim: A Bank Payments Simulation for Fraud Detection Research", The 26th European Modeling and Simulation Symposium, Sep. 2014, 10 pages.
(Continued)

*Primary Examiner* — Elda G Milef
(74) *Attorney, Agent, or Firm* — The Webb Law Firm

(57) ABSTRACT

Provided are methods, systems, and computer program products for verifying a card image file. A system may include at least one processor programmed or configured to parse a card image file to determine card data represented by the card image file, generate a plurality of simulated payment transactions based on the card data, each simulated payment transaction including simulated transaction data, issue a plurality of commands to the payment device emulator, the plurality of commands based on the simulated transaction data for the plurality of simulated payment transactions, receive a plurality of command responses generated by the payment device emulator based on the plurality (Continued)

of commands, and verify the card image file based on the plurality of command responses and the card data.

12 Claims, 8 Drawing Sheets

(56) References Cited

U.S. PATENT DOCUMENTS

| | | | |
|---|---|---|---|
| 9,425,907 | B2 | 8/2016 | Dhayni et al. |
| 9,449,320 | B1* | 9/2016 | Walters ............... G01R 27/28 |
| 10,475,034 | B2 | 11/2019 | Guise et al. |
| 10,698,795 | B2* | 6/2020 | Riddick ............. G06Q 20/4016 |
| 2009/0173784 | A1 | 7/2009 | Yang |
| 2009/0176784 | A1 | 7/2009 | Donner et al. |
| 2011/0125638 | A1 | 5/2011 | Davis et al. |
| 2012/0031969 | A1* | 2/2012 | Hammad ............. G06Q 20/341 |
| | | | 235/380 |
| 2015/0006390 | A1 | 1/2015 | Aissi et al. |
| 2016/0162883 | A1* | 6/2016 | Liscia ............... G06Q 20/363 |
| | | | 705/71 |
| 2017/0255937 | A1* | 9/2017 | Maddukuri ........ G06Q 20/3674 |
| 2019/0266584 | A1 | 8/2019 | Walters et al. |
| 2022/0188806 | A1* | 6/2022 | Ulrich ................ G06Q 20/4012 |

OTHER PUBLICATIONS

Rosebrock, "Credit card OCR with Open CV and Python", PyImageSearch, Jul. 17, 2017, 29 pages.

* cited by examiner

```xml
<Application AID="□□□□□□□□□□□□□□□□">
    <TerminalRequest name="Select" cmd="00" ins="A4" p1="04">
        <CardResponse state="WF_SELECTAPP" nextstate="WF_GPO">
            <Tag name="FCI Template" ID="6F">
                <Tag name="DF Name" ID="84" >□□□□□□□□□□□□□□□□</Tag>
                <Tag name="FCI Proprietary Template" ID="A5">
                    <Tag name="Application Label" ID ="50" format= "ISO-8859-1" >□□□□□□□□</Tag>
                    <Tag name="PDOL" ID="9F 38">9F 66 04 9F 02 06 9F 37 04 9F 1A 02</Tag>
                    <Tag name="Language Preference" ID="5F 2D">65 6E</Tag>
                    <Tag name="FCI Issuer Discretionary Data" ID="BF0C">
                        <Tag name="Issuer Identification Number" ID="42">47 61 73</Tag>
                        <Tag name="Issuer Country Code" ID="5F 55">55 53</Tag>
                        <Tag name="Application Program ID" ID="9F 5A">11 08 40 08 40</Tag>
                    </Tag>
                </Tag>
            </Tag>
        </CardResponse>
    </TerminalRequest>
    <TerminalRequest name= "GPO" cmd="80" ins="A8" p1 ="00" p2="00" cmdData="83?? '???? ???? ???? ????' ? *">
        <CardResponse>
            <Tag name="Response Message Template Format 2" ID="77">
                <Tag name="AIP" ID="82" >00 00</Tag>
                <Tag name="AFL" ID="94">08 06 06 00</ / Tag>
                <Tag name="Track2 Equivalent Data" ID="57">□□□□□□□□□□□□□□□□□□□□□□□□□□□□□□□□□□□□□□□□</Tag>
                <Tag name="Application PAN Sequence Number" ID="5F 34">□□</Tag>
                <Tag name="Cardholder Name" ID="5F 20" format="ISO-8859-1">□□□□□□□□□□□□□□□□</Tag>
                <Tag name="Issuer Application Data" ID="9F 10" cvn="0x11">06 01 11 03 [emvcard.iad(3)]</Tag>
                <Tag name="Application Cryptogram" ID="9F 26">[emvcard.appcrypto()]</Tag>
                <Tag name="CID" ID="9F 27">[emvcard.arqc()]</Tag>
                <Tag name="CTQ" ID="9F 6C">[emvcard.ctq()]</Tag>
                <Tag name="ATC" ID="9F 36">[emvcard.atc()]</Tag>
                <Tag name="Form Factor Indicator" ID="9F 6E">20 70 00 00</Tag>
            </Tag>
        </CardResponse>
    </TerminalRequest>
</Application>
```

FIG. 5A

```xml
<TerminalRequest name="ReadRecord" cmd="00" ins="B2" sfi="01" record="06">
    <CardResponse>
        <Tag name="AEF Data Template" ID="70">
            <Tag name="Issuer Country Code" ID="5F 28">08 40</Tag>
            <Tag name="Application Usage Control" ID="9F 07">C0 80</Tag>
        </Tag>
    </CardResponse>
</TerminalRequest>
<InternalTags>
    <Tag name="Track2 Equivalent Data" ID="57">□□□□□□□□□□□□□□□□□□□□□□□□□□□□□□□□□□□□□□</Tag>
    <Tag name="Cardholder Name" ID= "5F 20" format="ISO-8859-1">□□□□□□□□□□□□□□□□</Tag>
    <Tag name="Application PAN Sequence Number" ID="5F 34">□□</Tag>
    <Tag name="Issuer Country Code" ID="9F 57">08 40</Tag>
    <Tag name="MSD Offset" ID="9F 67">1E</Tag>
    <Tag name="CTQ" ID="9F 6C">00 00</Tag>
    <Tag name="Card Additional Processes (CAP)" ID="9F 68">10 00 10 00</Tag>
    <Tag name="Form Factor Indicator" ID="9F 6E">20 70 00 00</Tag>
</InternalTags>
</Application>
```

FIG. 5B

SYSTEM, METHOD, AND COMPUTER PROGRAM PRODUCT FOR VERIFYING A CARD IMAGE

CROSS-REFERENCE TO RELATED APPLICATIONS

This application is the United States national phase of International Application No. PCT/US2020/050863 filed Sep. 15, 2020, and claims priority to U.S. Provisional Application No. 62/900,870, filed on Sep. 16, 2019, the entire disclosures of which are hereby incorporated by reference in their entirety.

BACKGROUND

1. Technical Field

This disclosure relates generally to verifying a card image and, in one particular non-limiting embodiment, to a system, method, and computer program product for verifying a card image.

2. Technical Considerations

When testing a transaction terminal, such as a point-of-sale (POS) system including a card reader, a testing entity may provide one or more test cards that are preconfigured to provide card data to the terminal being tested. Each test card, after being properly preconfigured, may then cause the POS system to initiate a payment transaction during a test and, depending on whether the payment transaction was approved or not approved within a payment network, the individual testing of the POS system may determine that the POS system is operating as expected or if there is an error.

Such a scheme for testing, however, may not provide a level of detail desired when troubleshooting POS systems that do not operate as expected. For example, where the one or more test cards are not correctly preconfigured, an error may be identified during the testing of the transaction terminal. When an error occurs, the individual performing of the test may not be able to determine if the error is due to an error related to the card data provided to the POS system, such as the card data not being properly preconfigured, or if the error is due to the POS not operating correctly. As a result, the individual may need to provide additional test cards to determine whether the POS system is not operating as expected or, alternatively, whether the card data was not properly preconfigured. This may require additional steps to the troubleshooting process for the POS systems, which may allow additional opportunities for errors to be made during the validation process of the POS system. This may also cause additional network resources to be expended, particularly in a payment processing system and/or a testing system, when processing the payment transactions during each test.

SUMMARY

According to non-limiting embodiments or aspects, provided is a computer-implemented method, comprising: parsing, with at least one processor, a card image file to determine card data represented by the card image file, the card image file configured to be embedded on an integrated circuit of a payment device; generating, with at least one processor, a plurality of simulated payment transactions based on the card data, each simulated payment transaction comprising simulated transaction data; issuing, with at least one processor, a plurality of commands to a payment device emulator, the plurality of commands based on the simulated transaction data for the plurality of simulated payment transactions; receiving, with at least one processor, a plurality of command responses generated by the payment device emulator based on the plurality of commands; and verifying, with at least one processor, the card image file based on the plurality of command responses and the card data.

In non-limiting embodiments or aspects, generating the plurality of simulated payment transactions comprises identifying a subset of predefined payment transactions from a plurality of predefined payment transactions based on the card data. In non-limiting embodiments or aspects, wherein at least one command response of the plurality of command responses comprises dynamic card data, the dynamic card data comprising at least one of a cryptogram and a digital signature generated by the payment device emulator. In non-limiting embodiments or aspects, the method further comprises: generating, with at least one processor, a report based on verifying the card image file; and transmitting, with at least one processor, the report to a computing device. In non-limiting embodiments or aspects, the card data comprises: application data associated with at least one supported application; supported transaction data associated with at least one supported transaction type; and account data associated with a payment account. In non-limiting embodiments or aspects, the payment device emulator comprises a payment device or probe inserted into a card reader. In non-limiting embodiments or aspects, verifying the card image file comprises: comparing the plurality of command responses to expected values based on the card data; validating each command response of the plurality of command responses if the command response matches an expected value; and verifying the card image file in response to validating each command response of the plurality of command responses.

According to non-limiting embodiments or aspects, provided is a system, comprising: a payment device emulator comprising a payment device inserted into a card reader; and at least one processor in communication with the payment device emulator, the at least one processor programmed or configured to: parse a card image file to determine card data represented by the card image file, the card image file configured to be embedded on an integrated circuit of a payment device; generate a plurality of simulated payment transactions based on the card data, each simulated payment transaction comprising simulated transaction data; issue a plurality of commands to the payment device emulator, the plurality of commands based on the simulated transaction data for the plurality of simulated payment transactions; receive a plurality of command responses generated by the payment device emulator based on the plurality of commands; and verify the card image file based on the plurality of command responses and the card data.

In non-limiting embodiments, the at least one processor generates the plurality of simulated payment transactions by identifying a subset of predefined payment transactions from a plurality of predefined payment transactions based on the card data. In non-limiting embodiments, at least one command response of the plurality of command responses comprises dynamic card data, the dynamic card data comprising at least one of a cryptogram and a digital signature generated by the payment device emulator. In non-limiting embodiments, the at least one processor is further configured to: generate a report based on verifying the card image file;

and transmit the report to a computing device. In non-limiting embodiments, the card data comprises: application data associated with at least one supported application; supported transaction data associated with at least one supported transaction type; and account data associated with a payment account. In non-limiting embodiments, verifying the card image file comprises: comparing the plurality of command responses to expected values based on the card data; validating each command response of the plurality of command responses if the command response matches an expected value; and verifying the card image file in response to validating each command response of the plurality of command responses.

In non-limiting embodiments or aspects, provided is a computer program product comprising at least one non-transitory computer-readable medium comprising one or more instructions that, when executed by at least one processor, cause the at least one processor to: parse a card image file to determine card data represented by the card image file; generate a plurality of simulated payment transactions based on the card data, each simulated payment transaction comprising simulated transaction data; issue a plurality of commands to a payment device emulator, the plurality of commands based on the simulated transaction data for the plurality of simulated payment transactions; receive a plurality of command responses generated by the payment device emulator based on the plurality of commands; and verify the card image file based on the plurality of command responses and the card data.

In non-limiting embodiments or aspects, the at least one processor generates the plurality of simulated payment transactions by identifying a subset of predefined payment transactions from a plurality of predefined payment transactions based on the card data. In non-limiting embodiments or aspects, at least one command response of the plurality of command responses comprises dynamic card data, the dynamic card data comprising at least one of a cryptogram and digital signature generated by the payment device emulator. In non-limiting embodiments or aspects, the instructions further cause the at least one processor to: generate a report based on verifying the card image file and transmit the report to a computing device. In non-limiting embodiments or aspects, the card data comprises: application data associated with at least one supported application; supported transaction data associated with at least one supported transaction type; and account data associated with a payment account. In non-limiting embodiments or aspects, verifying the card image file comprises: comparing the plurality of command responses to expected values based on the card data; validating each command response of the plurality of command responses if the command response matches an expected value; and verifying the card image file in response to validating each command response of the plurality of command responses.

Further non-limiting embodiments or aspects will be set forth in the following numbered clauses:

Clause 1: A computer-implemented method, comprising: parsing, with at least one processor, a card image file to determine card data represented by the card image file, the card image file configured to be embedded on an integrated circuit of a payment device; generating, with at least one processor, a plurality of simulated payment transactions based on the card data, each simulated payment transaction comprising simulated transaction data; issuing, with at least one processor, a plurality of commands to a payment device emulator, the plurality of commands based on the simulated transaction data for the plurality of simulated payment transactions; receiving, with at least one processor, a plurality of command responses generated by the payment device emulator based on the plurality of commands; and verifying, with at least one processor, the card image file based on the plurality of command responses and the card data.

Clause 2: The computer-implemented method of clause 1, wherein generating the plurality of simulated payment transactions comprises identifying a subset of predefined payment transactions from a plurality of predefined payment transactions based on the card data.

Clause 3: The computer-implemented method of clauses 1 or 2, wherein at least one command response of the plurality of command responses comprises dynamic card data, the dynamic card data comprising at least one of a cryptogram and a digital signature generated by the payment device emulator.

Clause 4: The computer-implemented method of any of clauses 1-3, further comprising: generating, with at least one processor, a report based on verifying the card image file; and transmitting, with at least one processor, the report to a computing device.

Clause 5: The computer-implemented method of any of clauses 1-4, wherein the card data comprises: application data associated with at least one supported application; supported transaction data associated with at least one supported transaction type; and account data associated with a payment account.

Clause 6: The computer-implemented method of any of clauses 1-5, wherein the payment device emulator comprises a payment device or probe inserted into a card reader.

Clause 7: The computer-implemented method of any of clauses 1-6, wherein verifying the card image file comprises: comparing the plurality of command responses to expected values based on the card data; validating each command response of the plurality of command responses if the command response matches an expected value; and verifying the card image file in response to validating each command response of the plurality of command responses.

Clause 8: A system, comprising: a payment device emulator comprising a payment device inserted into a card reader; and at least one processor in communication with the payment device emulator, the at least one processor programmed or configured to: parse a card image file to determine card data represented by the card image file, the card image file configured to be embedded on an integrated circuit of a payment device; generate a plurality of simulated payment transactions based on the card data, each simulated payment transaction comprising simulated transaction data; issue a plurality of commands to the payment device emulator, the plurality of commands based on the simulated transaction data for the plurality of simulated payment transactions; receive a plurality of command responses generated by the payment device emulator based on the plurality of commands; and verify the card image file based on the plurality of command responses and the card data.

Clause 9: The system of clause 8, wherein the at least one processor generates the plurality of simulated payment transactions by identifying a subset of predefined payment transactions from a plurality of predefined payment transactions based on the card data.

Clause 10. The system of clauses 8 or 9, wherein at least one command response of the plurality of command responses comprises dynamic card data, the dynamic card data comprising at least one of a cryptogram and a digital signature generated by the payment device emulator.

Clause 11. The system of any of clauses 8-10, wherein the at least one processor is further configured to: generate a report based on verifying the card image file; and transmit the report to a computing device.

Clause 12. The system of any of clauses 8-11, wherein the card data comprises: application data associated with at least one supported application; supported transaction data associated with at least one supported transaction type; and account data associated with a payment account.

Clause 13. The system of any of clauses 8-12, wherein verifying the card image file comprises: comparing the plurality of command responses to expected values based on the card data; validating each command response of the plurality of command responses if the command response matches an expected value; and verifying the card image file in response to validating each command response of the plurality of command responses.

Clause 14: A computer program product comprising at least one non-transitory computer-readable medium comprising one or more instructions that, when executed by at least one processor, cause the at least one processor to: parse a card image file to determine card data represented by the card image file; generate a plurality of simulated payment transactions based on the card data, each simulated payment transaction comprising simulated transaction data; issue a plurality of commands to a payment device emulator, the plurality of commands based on the simulated transaction data for the plurality of simulated payment transactions; receive a plurality of command responses generated by the payment device emulator based on the plurality of commands; and verify the card image file based on the plurality of command responses and the card data.

Clause 15. The computer program product of clause 14, wherein the at least one processor generates the plurality of simulated payment transactions by identifying a subset of predefined payment transactions from a plurality of predefined payment transactions based on the card data.

Clause 16: The computer program product of clauses 14 or 15, wherein at least one command response of the plurality of command responses comprises dynamic card data, the dynamic card data comprising at least one of a cryptogram and digital signature generated by the payment device emulator.

Clause 17: The computer program product of any of clauses 14-16, wherein the instructions further cause the at least one processor to: generate a report based on verifying the card image file; and transmit the report to a computing device.

Clause 18: The computer program product of any of clauses 14-17, wherein the card data comprises: application data associated with at least one supported application; supported transaction data associated with at least one supported transaction type; and account data associated with a payment account.

Clause 19: The computer program product of any of clauses 14-18, wherein verifying the card image file comprises: comparing the plurality of command responses to expected values based on the card data; validating each command response of the plurality of command responses if the command response matches an expected value; and verifying the card image file in response to validating each command response of the plurality of command responses.

The features and characteristics of the present disclosure, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the present disclosure. As used in the specification and the claims, the singular form of "a," "an," and "the" include plural referents unless the context clearly dictates otherwise.

BRIEF DESCRIPTION OF THE DRAWINGS

Additional advantages and details of the present disclosure are explained in greater detail below with reference to the exemplary embodiments that are illustrated in the accompanying schematic figures, in which:

FIGS. 5A and 5B illustrate a card image file according to non-limiting embodiments or aspects;

DETAILED DESCRIPTION

Figure 1:
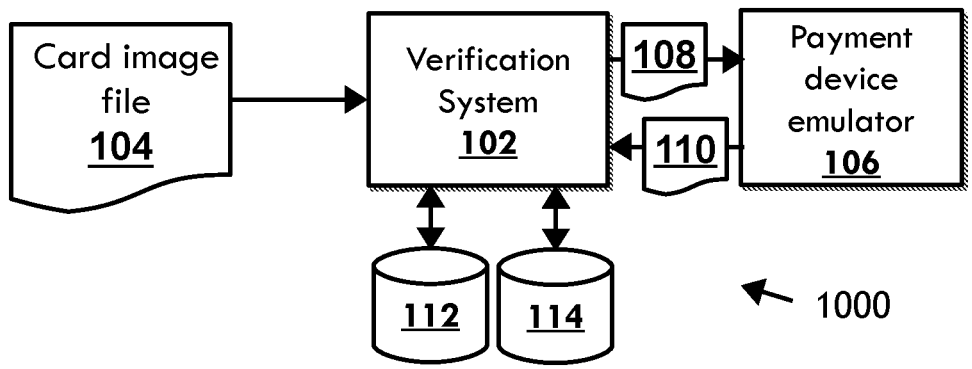
FIG. 1 is a diagram of a system for verifying a card image according to non-limiting embodiments or aspects.

For purposes of the description hereinafter, the terms "end," "upper," "lower," "right," "left," "vertical," "horizontal," "top," "bottom," "lateral," "longitudinal," and derivatives thereof shall relate to the disclosure as it is oriented in the drawing figures. However, it is to be understood that the disclosure may assume various alternative variations and step sequences, except where expressly specified to the contrary. It is also to be understood that the specific devices and processes illustrated in the attached drawings, and described in the following specification, are simply exemplary embodiments or aspects of the disclosure. Hence, specific dimensions and other physical characteristics related to the embodiments or aspects of the embodiments disclosed herein are not to be considered as limiting unless otherwise indicated.

No aspect, component, element, structure, act, step, function, instruction, and/or the like used herein should be construed as critical or essential unless explicitly described as such. Also, as used herein, the articles "a" and "an" are intended to include one or more items and may be used interchangeably with "one or more" and "at least one." Furthermore, as used herein, the term "set" is intended to include one or more items (e.g., related items, unrelated items, a combination of related and unrelated items, and/or the like) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise.

As used herein, the terms "communication" and "communicate" may refer to the reception, receipt, transmission, transfer, provision, and/or the like of information (e.g., data, signals, messages, instructions, commands, and/or the like). For one unit (e.g., a device, a system, a component of a device or system, combinations thereof, and/or the like) to be in communication with another unit means that the one unit is able to directly or indirectly receive information from and/or send (e.g., transmit) information to the other unit. This may refer to a direct or indirect connection that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively send information to the second unit. As another example, a first unit may be in communication with a second unit if at least one intermediary unit (e.g., a third unit located between the first unit and the second unit) processes information received from the first unit and sends the processed information to the second unit. In some non-limiting embodiments or aspects, a message may refer to a network packet (e.g., a data packet and/or the like) that includes data.

As used herein, the terms "issuer," "issuer institution," "issuer bank," or "payment device issuer," may refer to one or more entities that provide accounts to individuals (e.g., users, customers, and/or the like) for conducting payment transactions, such as credit payment transactions and/or debit payment transactions. For example, an issuer institution may provide an account identifier, such as a primary account number (PAN), to a customer that uniquely identifies one or more accounts associated with that customer. In some non-limiting embodiments or aspects, an issuer may be associated with a bank identification number (BIN) that uniquely identifies the issuer institution. As used herein, the term "issuer system" may refer to one or more computer systems operated by or on behalf of an issuer, such as a server executing one or more software applications. For example, an issuer system may include one or more authorization servers for authorizing a transaction.

As used herein, the term "account identifier" may include one or more types of identifiers associated with an account (e.g., a PAN associated with an account, a card number associated with an account, a payment card number associated with an account, a token associated with an account, and/or the like). In some non-limiting embodiments or aspects, an issuer may provide an account identifier (e.g., a PAN, a token, and/or the like) to a user (e.g., an account holder) that uniquely identifies one or more accounts associated with that user. The account identifier may be embodied on a payment device (e.g., a physical instrument used for conducting payment transactions, such as a payment card, a credit card, a debit card, a gift card, and/or the like) and/or may be electronic information communicated to the user that the user may use for electronic payment transactions. In some non-limiting embodiments or aspects, the account identifier may be an original account identifier, where the original account identifier was provided to a user at the creation of the account associated with the account identifier. In some non-limiting embodiments or aspects, the account identifier may be a supplemental account identifier, which may include an account identifier that is provided to a user after the original account identifier was provided to the user. For example, if the original account identifier is forgotten, stolen, and/or the like, a supplemental account identifier may be provided to the user. In some non-limiting embodiments or aspects, an account identifier may be directly or indirectly associated with an issuer institution such that an account identifier may be a token that maps to a PAN or other type of account identifier. Account identifiers may be alphanumeric, any combination of characters and/or symbols, and/or the like.

As used herein, the term "merchant" may refer to one or more entities (e.g., operators of retail businesses) that provide goods, services, and/or access to goods and/or services to a user (e.g., a customer, a consumer, and/or the like) based on a transaction, such as a payment transaction. As used herein, the term "merchant system" may refer to one or more computer systems operated by or on behalf of a merchant, such as a server executing one or more software applications. As used herein, the term "product" may refer to one or more goods and/or services offered by a merchant.

As used herein, the term "point-of-sale (POS) device" may refer to one or more electronic devices which may be used by a merchant to initiate a transaction (e.g., a payment transaction), such as a transaction terminal. A POS device may include peripheral devices, card readers, scanning devices (e.g., code scanners and/or the like), Bluetooth® communication receivers, near-field communication (NFC) receivers, radio frequency identification (RFID) receivers, and/or other contactless transceivers or receivers, contact-based receivers, payment terminals, and/or the like. As used herein, the term "point-of-sale (POS) system" may refer to one or more client devices and/or peripheral devices used by a merchant to conduct a transaction. For example, a POS system may include one or more POS devices and/or other like devices that may be used to conduct a payment transaction. In some non-limiting embodiments or aspects, a POS system (e.g., a merchant POS system) may include one or more server computers programmed or configured to process online payment transactions through webpages, mobile applications, and/or the like.

As used herein, the term "transaction service provider" may refer to an entity that receives transaction authorization requests from merchants or other entities and provides guarantees of payment, in some cases through an agreement between the transaction service provider and an issuer institution. In some non-limiting embodiments or aspects, a transaction service provider may include a credit card company, a debit card company, a payment network such as Visa®, MasterCard®, American Express®, or any other entity that processes transaction. As used herein, the term "transaction service provider system" may refer to one or more computer systems operated by or on behalf of a transaction service provider, such as a transaction service provider system executing one or more software applications. A transaction service provider system may include one or more processors and, in some non-limiting embodiments or aspects, may be operated by or on behalf of a transaction service provider.

As used herein, the term "computing device" may refer to one or more electronic devices configured to process data. A computing device may, in some examples, include the necessary components to receive, process, and output data, such as a processor, a display, a memory, an input device, a network interface, and/or the like. A computing device may be a mobile device. As an example, a mobile device may include a cellular phone (e.g., a smartphone or standard cellular phone), a portable computer, a wearable device (e.g., watches, glasses, lenses, clothing, and/or the like), a personal digital assistant (PDA), and/or other like devices. A computing device may also be a desktop computer or other form of non-mobile computer.

As used herein, the term "server" may refer to or include one or more computing devices that are operated by or facilitate communication and processing for multiple parties in a network environment, such as the Internet, although it will be appreciated that communication may be facilitated over one or more public or private network environments and that various other arrangements are possible. Further, multiple computing devices (e.g., servers, POS devices, mobile devices, and/or the like) directly or indirectly communicating in the network environment may constitute a "system." Reference to "a server" or "a processor," as used herein, may refer to a previously-recited server and/or processor that is recited as performing a previous step or function, a different server and/or processor, and/or a combination of servers and/or processors. For example, as used in the specification and the claims, a first server and/or a first processor that is recited as performing a first step or function may refer to the same or different server and/or a processor recited as performing a second step or function.

Non-limiting embodiments or aspects of the present disclosure are directed to methods, systems, and computer program products for verifying a card image and/or testing a transaction terminal. By virtue of the features described herein, POS systems may be tested without necessarily involving additional processing by external systems or entities (e.g., transaction service provider systems, payment gateway service provider systems, and/or the like). This allows for computing resources to be saved and prevents unnecessary traffic on an existing payment processing network. Moreover, in non-limiting embodiments, the systems and methods described herein may permit individuals testing a POS system to be provided with an enhanced level of detail that is desirable when troubleshooting POS systems. For example, one or more test cards may be checked to verify that they are correctly preconfigured prior to testing a POS system and, as a result, additional test cards may not be needed to determine whether the POS system is or is not operating as expected. Additionally, network resources may be conserved that would otherwise be expended determining whether a POS system is not operating as expected or a card image is properly preconfigured.

Referring now to FIG. 1, a system 1000 for verifying a card image is shown according to a non-limiting embodiment. The system 1000 includes a verification system 102, which may be a computing device executing one or more software applications. In non-limiting embodiments, the card image verification system 102 may take the place of a transaction terminal, in a general testing implementation used to test transaction terminals and/or payment devices, for the purpose of validating a card image file 104. The verification system 102 is in communication with a verification database 112 and a payment device emulator 106. The payment device emulator 106 may include a computing device configured to provide an emulation output for a payment device, such as an EMV chip. The payment device emulator 106 may include a physical payment device, such as a card including an EMV chip, or a simulated payment device, such as a probe that is inserted into a card reader (shown in FIG. 2) and in communication with a computing device that generates signals representative of a payment device and sends them via the probe. In non-limiting embodiments, the payment device emulator 106 emulates a payment device including the card data presented by the card image file 104. As used herein, the term "payment device" may refer to an integrated circuit having data stored thereon that is configured for contact and/or contactless payment functions at transaction terminals. A payment device may also refer to a physical payment card, such as a credit or debit card, having an integrated circuit embedded thereon. The verification system 102 may be in communication with a verification database 112 that stores verification results and a transaction database 114 that stores predefined transactions.

Figure 2:
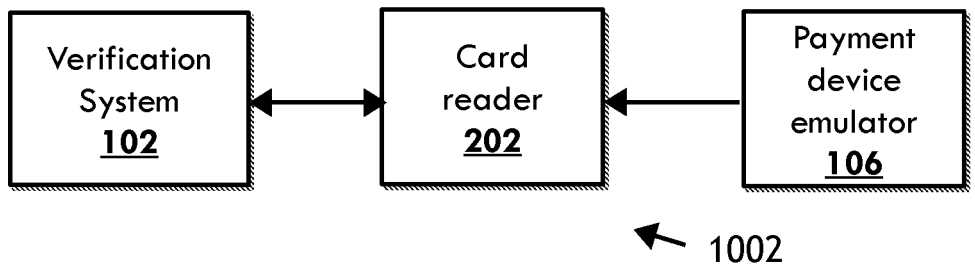
FIG. 2 is a diagram of a system for verifying a card image according to non-limiting embodiments or aspects.

Another diagram of a system 1002 for verifying a card image is shown in FIG. 2 according to non-limiting embodiments or aspects. As shown in FIG. 2, the verification system 102 may be in communication with a card reader 202. The card reader 202 may include a device configured to receive a payment device, such as an EMV chip, and to access data stored on the payment device. As an example, the card reader 202 may be internal to the verification system (e.g., the verification system may be a desktop or laptop computer with an internal card reader) and/or may be an external peripheral device. The card reader 202 may be configured for contact-based communication through a physical connection (e.g., through one or more electrical contacts) and/or contactless communication through short range wireless communication (e.g., an NFC communication connection, an RFID communication connection, a Bluetooth® communication connection, and/or the like).

With continued reference to FIGS. 1 and 2, the verification system 102 issues commands 108 (e.g., generates and communicates commands) to the payment device emulator 106 and receives command responses 110. The commands 108 may include instructions configured to cause the payment device emulator 106 to return one or more values and/or perform one or more functions. In this manner, the verification system 102 verifies the card image file 104 and the card data stored therein by comparing the card data to command responses 110 received from the payment device emulator 106 and validating various portions of the card image file 104. The results of such verification may be stored in the verification database 112. In some non-limiting embodiments, the results of the verification may be communicated to a separate system, such as a transaction processing system (not shown), over one or more networks.

Figure 3:
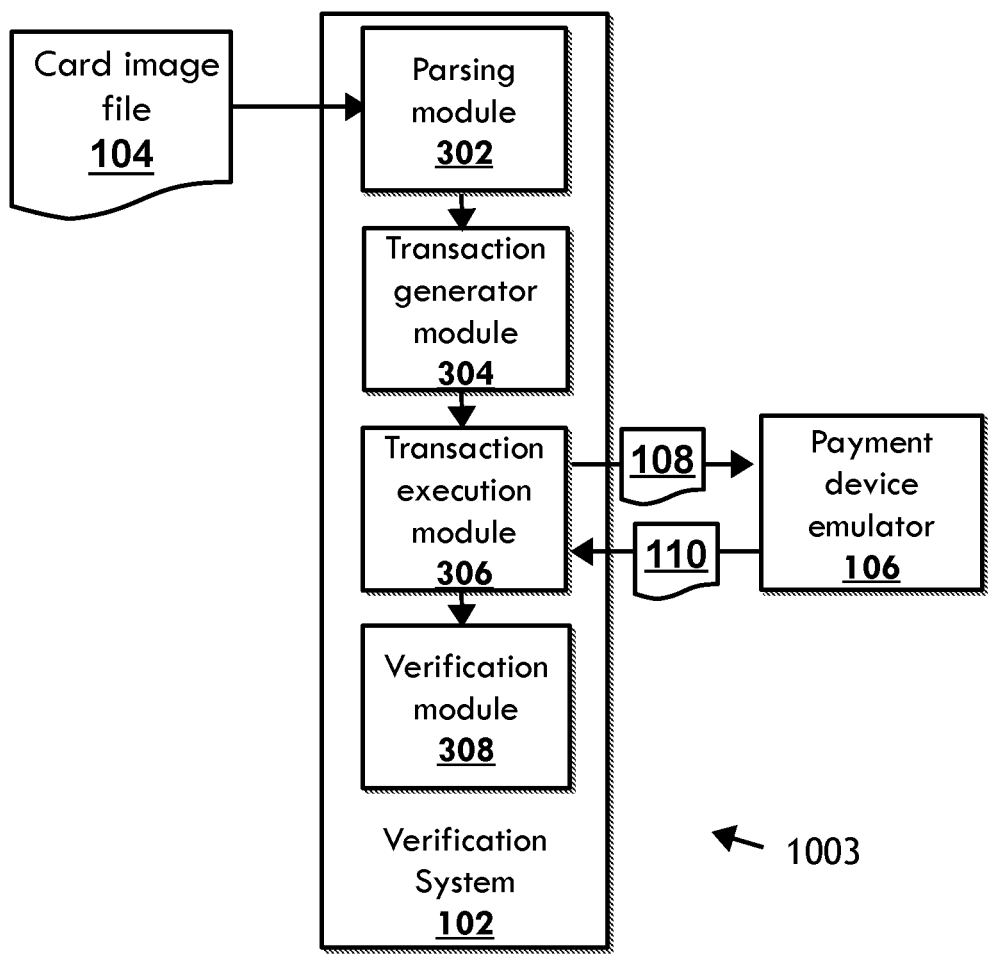
FIG. 3. is a diagram of a system for verifying a card image according to non-limiting embodiments or aspects.

Referring now to FIG. 3, a system 1003 for verifying a card image is shown according to a non-limiting embodiment. The verification system 102 in FIG. 3 includes a parsing module 302, a transaction generator module 304, a transaction execution module 306, and a verification module 308, each of which may include one or more software and/or hardware components. For example, the modules 302, 304, 306, 308 may each be a function of one or more software applications executed by one or more computing devices and/or may each be a separate computing device. Moreover, one or more of the modules 302, 304, 306, 308 may be services provided by a remote server (not shown in FIG. 3) by request, via an Application Programming Interface (API), for example. It will be appreciated that various arrangements of the modules 302, 304, 306, 308 may be used.

With continued reference to FIG. 3, the parsing module 302 may parse the card data from the card image file 104. For example, the parsing module 302 may parse the card data to determine application data associated with at least one supported application. In another example, the parsing module 302 may parse the card data to determine supported transaction data associated with the at least one supported transaction type. In another example, the parsing module 302 may parse the card data to determine account data associated with the payment account. Parsing the card data may include moving and/or copying the card data to another location, such as the memory of a computing device. Parsing the card data may split the card data into different data groups that are specified by one or more rules. The data groups may be predefined and customized based on the requirements of the user. In non-limiting embodiments, the parsed card data may maintain the same data structure as the card data in the card image file 104.

With continued reference to FIG. 3, the transaction generator module 304 may generate one or more simulated transactions based on the card data. For example, the transaction generator module 304 may identify one or more predefined transactions from the transaction database 114, where the predefined transactions each include simulated transaction data, such as transaction amount, date/time, a PAN, expiration date, and/or the like. In other examples, the transaction generator module 304 may dynamically generate transactions with random and/or determined values based on the card data. The transaction generation module determines the transactions and simulated transaction data based on the card data (e.g., application data representing applications that are available, supported transaction data representing transaction types that are available, account data identifying features or parameters of the user's account, and/or the like).

For example, the transaction generator module 304 may determine that the card image is associated with a contactless payment transaction and, in response, may generate simulated transaction data for a contactless transaction. In such a case, the simulated transaction data for the generated transaction may specify a contactless protocol (e.g., ISO 14443). As another example, the transaction generator module 304 may determine that the card image is associated with a contact payment transaction and, in response, may generate simulated transaction data for a contactless transaction that specifies a contact-based protocol (e.g., ISO 7816). It will be appreciated that the transactions and/or simulated transaction data may also be retrieved from a separate system by the verification system 102. In some non-limiting embodiments, the verification system 102 may generate the transaction data with an emulation of a POS device. For example, the image verification system 102 may provide the card data, the application data, the supported transaction data, and/or the account data as input to an emulation of a POS device to cause the emulation of the POS device to provide, as an output, the transaction data.

Still referring to FIG. 3, the transaction execution module 306 may execute the transactions, based on the simulated transaction data for each transaction, using the payment device emulator 106. The transaction execution module 306 may generate a plurality of commands 108 to be issued (e.g., communicated) to the payment device emulator 106. The commands 108 may be generated based on the simulated transaction data for each transaction. Each command 108 may be for a discrete transaction and/or specific function associated with a discrete transaction. For example, a command 108 may involve reading account data from the payment device emulator 106. A command 108 may also request generation of a cryptogram based on account data and an encryption key. The transaction execution module 306 also receives command responses 110 from the payment device emulator 106 for each command 108 or batch of commands 108.

With continued reference to FIG. 3, the verification module 308 may determine a verification result based on verifying the command response(s) 110. For example, the verification system 102 (e.g., the parsing module 302) may derive static transaction data (e.g., a PAN, expiration date, name, and/or the like) associated with a valid payment transaction response from the card data. The verification module 308 may compare the static data and/or a valid payment transaction response generated based on the static transaction data to the command response 110. In such an example, the verification module 308 may determine that the simulated payment transaction is valid or not valid based on comparing the static data or the valid simulated payment transaction response generated based on the static transaction data to the simulated payment transaction response data received or derived from the command response 110. In response to determining that the values match (e.g., that the static data is valid), the verification module 308 may determine that the card image file 104 is verified or partially verified. In response to determining that the values do not match, the verification module 308 may determine that the card image file 104 is not verified or invalid.

In another non-limiting example, the verification system 102 (e.g., the transaction generator module 304) may derive dynamic transaction data associated with a valid payment transaction response from the card data. For example, the verification system 102 may generate a cryptogram based on account data from the card data and at least one encryption key. The verification module 308 may compare the dynamic data (e.g., cryptogram) to dynamic transaction data returned in the command response 110 (e.g., a cryptogram generated with the payment device emulator). In such an example, the verification module 308 may determine that the cryptogram is valid or not valid based on comparing the two cryptograms or other dynamically generated data. In response to determining that the values match, the verification module 308 may determine that the card image file 104 is verified or partially verified. In response to determining that the values do not match, the verification module 308 may determine that the card image file 104 is not verified or invalid.

In another non-limiting example, the verification module 308 may compare a simulated response code returned from the command response 110 to a predetermined valid response code. For example, the verification module 308 may compare the simulated response code to a predetermined valid response code from an index of valid response codes. In response to determining that the codes match, the verification module 308 may determine that the card image file 104 is verified or partially verified. In response to determining that the codes do not match, the verification module 308 may determine that the card image file 104 is not verified or invalid.

Still referring to FIG. 3, in some non-limiting embodiments, verification module 308 may determine that the card image file 104 is verified or not verified based one or more command responses 110 and comparisons. For example, the verification module 308 may determine that the card image file 104 is verified in response to every command response 110 being validated of a plurality of command responses. Likewise, the verification module 308 may determine that the card image file 104 is not verified in response to a single command response 110, a specific command response 110, and/or a predetermined number of command responses 110 being determined to be invalid. In non-limiting embodiments, a card image file 104 is verified if every one of the command response 110 received is validated.

In non-limiting embodiments, the verification module 308 may automatically generate a report based on determining that the card image file 104 is verified or not verified. The report may include a summary of the commands 108 and command responses 110 executed and/or determined to be valid and/or invalid. The report may be automatically communicated to a computing device based on the results or regardless of the results. For example, the report may be communicated from the verification system 102 to a transaction processing system (not shown in FIG. 3). In some non-limiting embodiments or aspects, the report may be represented in a machine readable equivalent format (e.g., an extensible markup language (XML) and/or Hypertext Markup Language (HTML) format).

Figure 4:
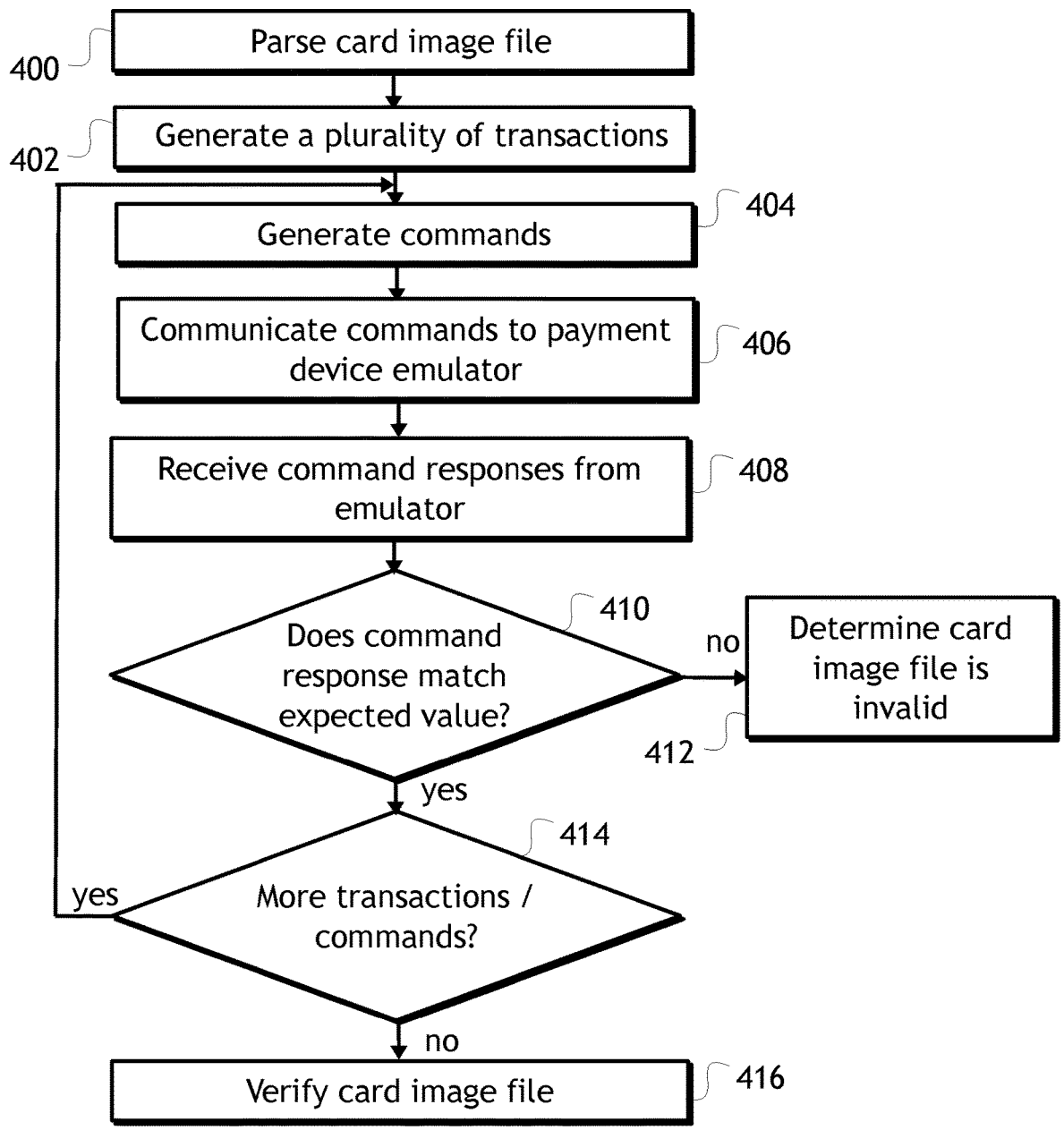
FIG. 4 is a flowchart of a method for verifying a card image according to non-limiting embodiments or aspects.

Referring now to FIG. 4, shown is a flowchart of a non-limiting embodiment of a process for verifying a card image file. In some non-limiting embodiments, one or more of the steps of the process may be performed (e.g., completely, partially, and/or the like) by the verification system 102 (e.g., one or more devices of the verification system 102). In some non-limiting embodiments or aspects, one or more of the steps of process may be performed (e.g., completely, partially, and/or the like) by another device or a group of devices separate from or including the verification system 102, such as a computing device. The steps shown in FIG. 4 are for example purposes only. Additional, fewer, different, and/or a different order of steps may be used.

Referring to a first step 400, a card image file is parsed to extract card data from the card image file. For example, the verification system 102 may parse the card data to determine application data associated with at least one supported application, supported transaction data associated with the at least one supported transaction type, account data associated with the payment account, and/or the like. At a next step 402, a plurality of transactions is generated based on the card data determined in step 400. For example, one or more predefined transactions may be identified, where the predefined transactions each include simulated transaction data such as transaction amount, date/time, a PAN, expiration date, and/or the like. In other examples. The transactions and simulated transaction data are determined based on the card data (e.g., application data representing applications that are available, supported transaction data representing transaction types that are available, account data identifying features or parameters of the user's account, and/or the like).

Referring to step 404 of FIG. 4, the plurality of transactions generated at step 402 are executed, starting with the generation of a plurality of commands to be issued (e.g., communicated) to a payment device emulator. The commands may be generated based on the simulated transaction data for each transaction. Each command may be for a discrete transaction and/or specific function associated with a discrete transaction. For example, a command may involve reading account data from the payment device emulator. A command may also request generation of a cryptogram based on account data and an encryption key. At step 406, the commands are issued (e.g., communicated) to the payment device emulator which executes the commands and returns a command response. The command responses are received at step 408. It will be appreciated that commands and responses may be individual and/or may be in batches.

At step 410, the command responses are validated by comparing the command responses, or date included in the command responses, to expected values from the card data obtained at step 400, the transaction data generated at step 402, and/or any other value derived therefrom. If any of the matches fail (e.g., the data does not match), the method proceeds to step 412 and it is determined that the card image file is invalid and therefore is not verified. If the values match at step 410, the method proceeds to step 414 to iterate through any additional transactions and/or commands. Steps 404 through 414 may repeat until ending with an invalid value at step 412 or completing all of the transactions generated at step 402. In some examples, even if an invalid value is found at step 412, the method may proceed to test the other aspects of the card image file and therefore not terminate at step 412.

At step 416, once all of the transactions and/or commands have been processed, the card image file is verified. For example, in response to reaching step 416 without invalidating any of the static data and/or dynamic data, the card image file may automatically be determined to be verified. In non-limiting embodiments, a card image file is verified at step 416 if every one of the command responses received are validated at step 410. At step 416, a report may be automatically generated based on determining that the card image file is verified or not verified. The report may include a summary of the commands and command responses executed and/or determined to be valid and/or invalid.

FIGS. 5A and 5B show a card image file according to non-limiting embodiments. In the depicted example, the card image file is in extensible markup language (XML) format, although various other forms of structured data may be used. The card data in the depicted card image file is in an EMV L3 format, although it will be appreciated that other formats and protocols may be used.

Figure 6:
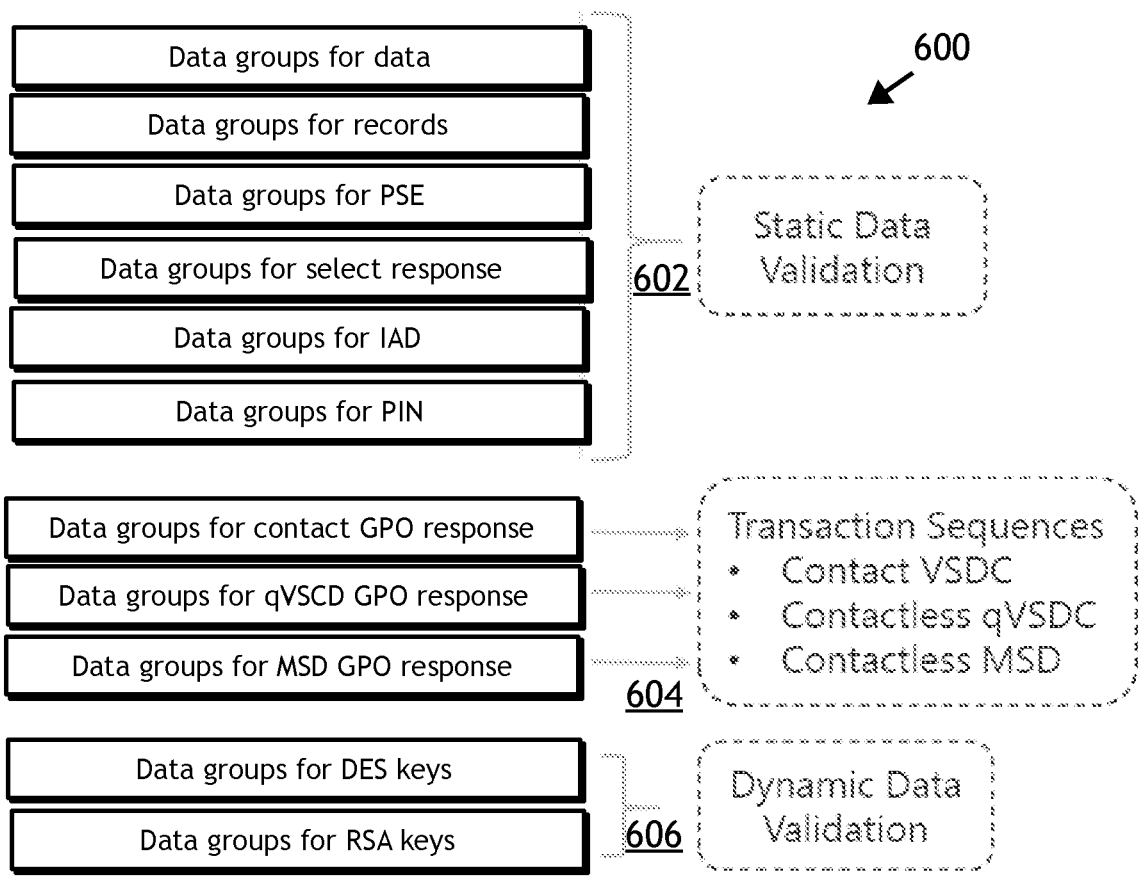
FIG. 6 shows a card personalization data map according to non-limiting embodiments or aspects.

FIG. 6 shows card data extracted from a card image file in the form of a card personalization data map 600. The card data is split into different Indexed Data Groups 602, 604, 606 that is specified by one or more rules. The data groups may be predefined and customized based on the requirements of the user. The system, such as the transaction generator module 304 of the verification system 102 shown in FIG. 3, determines what data to validate from each data group. The types of transactions supported (e.g., contact, contactless, and/or type of protocol) may be specified in the card data or derived from the data. For example, the transaction protocol may include Visa Smart Debit/Credit (VSDC), quick VSDC (qVSDC), Magstripe (MSD), and/or any other type of payment protocol. Once the transaction types are identified, the transactions generated with simulated transaction data may include transaction sequences 604 for execution, such that the transaction sequences 604 represent one or more sequential commands that will be issued to the payment device emulator.

Figure 7:
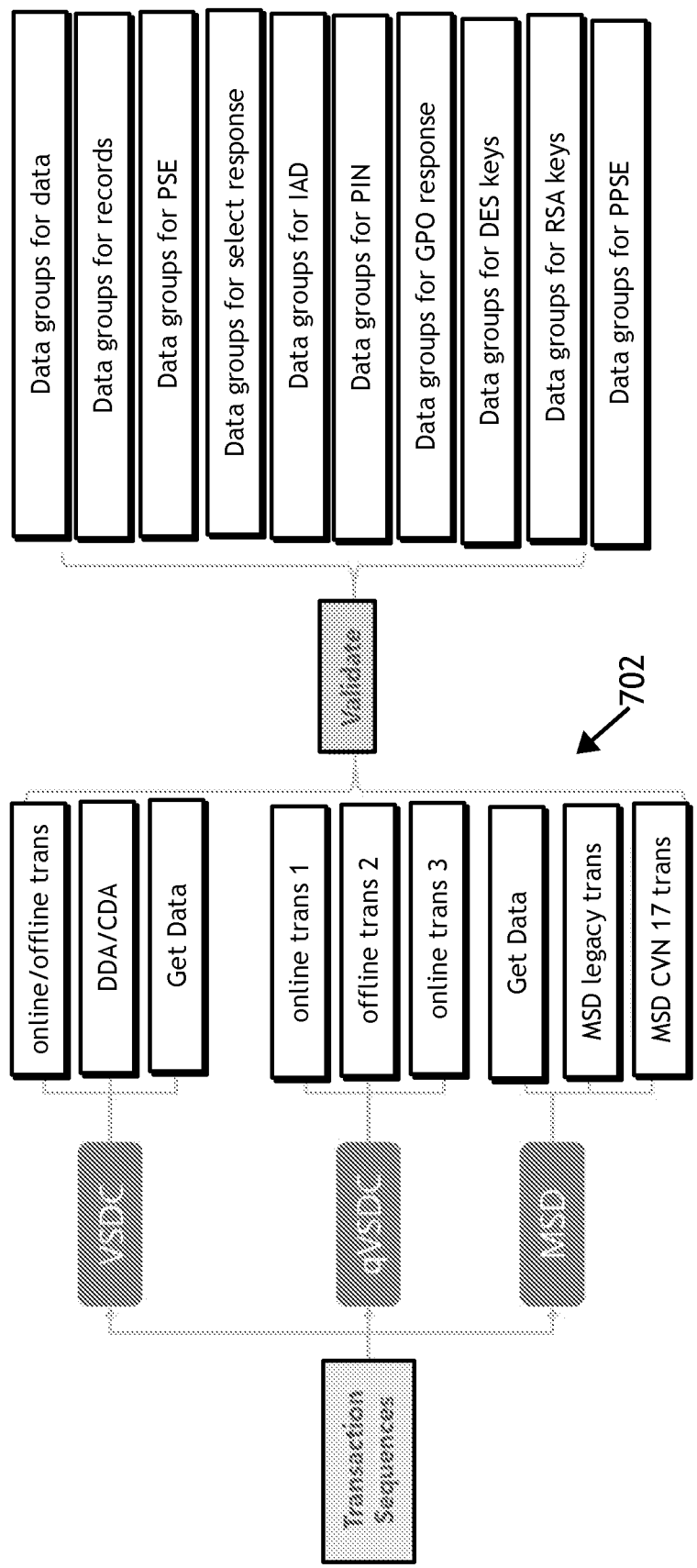
FIG. 7 shows the validation of transaction sequences according to non-limiting embodiments or aspects.

FIG. 7 shows the validation of transaction sequences involving different protocols (VSDC, qVSDC, MSD), where each transaction sequence includes several commands 702 that are issued and used to match against expected values for validation. If all commands are determined to return valid values, the card image file is determined to be verified. The responses to the commands may return static and/or dynamic transaction data. Static transaction data may be validated by comparing the static transaction data to expected values. Dynamic transaction data may be computed based on the transaction sequence. The computed dynamic transaction data may then be validated by comparing the computed dynamic transaction data to expected values of dynamic transaction data.

Figure 8:
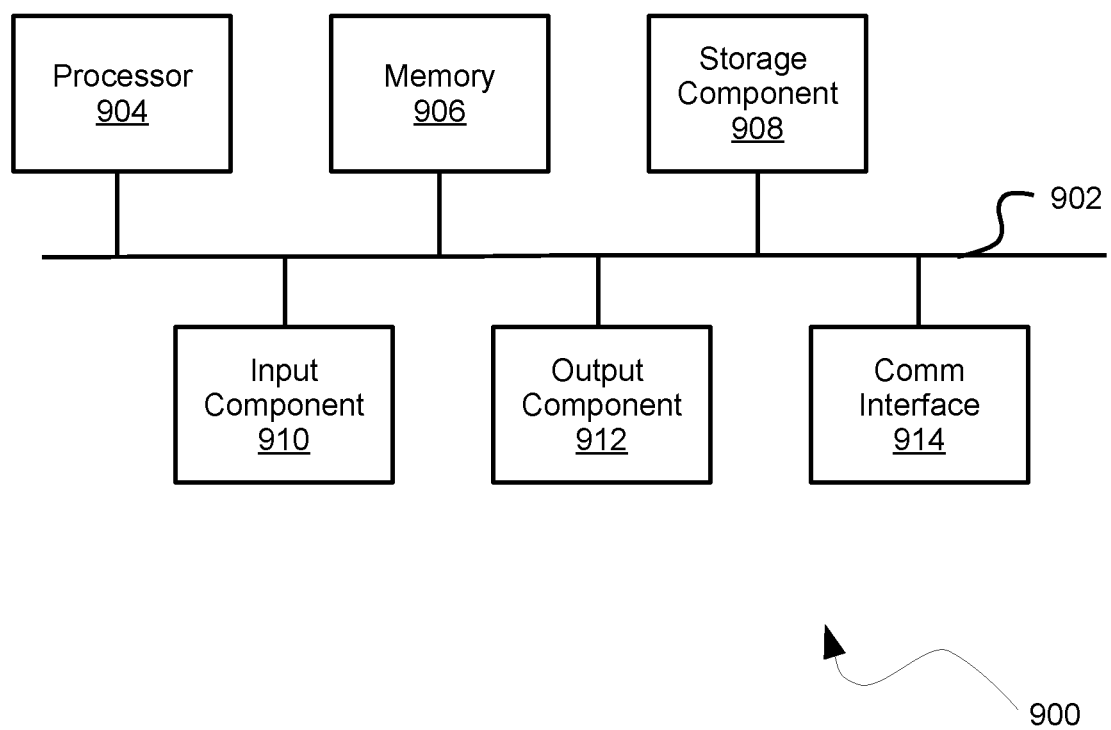
FIG. 8 is a diagram of a non-limiting embodiment of components of one or more devices of FIGS. 1-3.

Referring now to FIG. 8, shown is a diagram of example components of a device 900. Device 900 may correspond to the verification system 102 and/or payment device emulator 106 in FIG. 1, as examples. In some non-limiting embodiments, such systems or devices may include at least one device 900 and/or at least one component of device 900. The number and arrangement of components shown are provided as an example. In some non-limiting embodiments, the device 900 may include additional components, fewer components, different components, or differently arranged components than those shown in FIG. 1. Additionally, or alternatively, a set of components (e.g., one or more components)

of the device 900 may perform one or more functions described as being performed by another set of components of device 900.

As shown in FIG. 8, device 900 may include a bus 902, a processor 904, memory 906, a storage component 908, an input component 910, an output component 912, and a communication interface 914. The bus 902 may include a component that permits communication among the components of the device 900. In some non-limiting embodiments, the processor 904 may be implemented in hardware, firmware, or a combination of hardware and software. For example, the processor 904 may include a processor (e.g., a central processing unit (CPU), a graphics processing unit (GPU), an accelerated processing unit (APU), etc.), a microprocessor, a digital signal processor (DSP), and/or any processing component (e.g., a field-programmable gate array (FPGA), an application-specific integrated circuit (ASIC), etc.) that can be programmed to perform a function. Memory 906 may include random access memory (RAM), read only memory (ROM), and/or another type of dynamic or static storage device (e.g., flash memory, magnetic memory, optical memory, etc.) that stores information and/or instructions for use by processor 904.

With continued reference to FIG. 8, the storage component 908 may store information and/or software related to the operation and use of the device 900. For example, the storage component 908 may include a hard disk (e.g., a magnetic disk, an optical disk, a magneto-optic disk, a solid state disk, etc.) and/or another type of computer-readable medium. The input component 910 may include a component that permits the device 900 to receive information, such as via user input (e.g., a touch screen display, a keyboard, a keypad, a mouse, a button, a switch, a microphone, etc.). Additionally, or alternatively, the input component 910 may include a sensor for sensing information (e.g., a global positioning system (GPS) component, an accelerometer, a gyroscope, an actuator, etc.). The output component 912 may include a component that provides output information from the device 900 (e.g., a display, a speaker, one or more light-emitting diodes (LEDs), etc.). The communication interface 914 may include a transceiver-like component (e.g., a transceiver, a separate receiver and transmitter, etc.) that enables the device 900 to communicate with other devices, such as via a wired connection, a wireless connection, or a combination of wired and wireless connections. The communication interface 914 may permit the device 900 to receive information from another device and/or provide information to another device. For example, the communication interface 914 may include an Ethernet interface, an optical interface, a coaxial interface, an infrared interface, a radio frequency (RF) interface, a universal serial bus (USB) interface, a Wi-Fi® interface, a cellular network interface, and/or the like.

The device 900 may perform one or more processes described herein. The device 900 may perform these processes based on the processor 904 executing software instructions stored by a computer-readable medium, such as the memory 906 and/or the storage component 908. A computer-readable medium may include any non-transitory memory device. A memory device includes memory space located inside of a single physical storage device or memory space spread across multiple physical storage devices. Software instructions may be read into the memory 906 and/or the storage component 908 from another computer-readable medium or from another device via the communication interface 914. When executed, software instructions stored in the memory 906 and/or storage component 908 may cause the processor 904 to perform one or more processes described herein. Additionally, or alternatively, hardwired circuitry may be used in place of or in combination with software instructions to perform one or more processes described herein. Thus, embodiments described herein are not limited to any specific combination of hardware circuitry and software. The term "programmed or configured," as used herein, refers to an arrangement of software, hardware circuitry, or any combination thereof on one or more devices.

Although embodiments have been described in detail for the purpose of illustration, it is to be understood that such detail is solely for that purpose and that the disclosure is not limited to the disclosed embodiments, but, on the contrary, is intended to cover modifications and equivalent arrangements that are within the spirit and scope of the appended claims. For example, it is to be understood that the present disclosure contemplates that, to the extent possible, one or more features of any embodiment can be combined with one or more features of any other embodiment.

What is claimed is:

1. A computer-implemented method, comprising:
    parsing, with at least one processor, a card image file to extract card data stored on the card image file, the card image file configured to be embedded on an integrated circuit of a payment card;
    generating, with at least one processor, at least one first cryptogram based on the card data and at least one encryption key;
    generating, with at least one processor, a plurality of simulated payment transactions based on the card data, each simulated payment transaction comprising simulated transaction data, wherein the simulated transaction data is generated via an emulation of a point of sale (POS) device, and wherein the emulation of the POS device receives at least the card data as an input and provides the simulated transaction data as an output;
    generating, with at least one processor, transaction sequences comprising a plurality of sequential commands based on the simulated transaction data for the plurality of simulated payment transactions, wherein each of the plurality of sequential commands is associated with a discrete transaction of the plurality of simulated payment transactions;
    communicating, with at least one processor, the plurality of sequential commands to a payment device emulator, the payment device emulator comprising a simulated payment device comprising a probe inserted into a card reader, wherein the probe is in communication with a first computing device that generates signals representative of a payment device and sends the signals to the payment device emulator via the probe, and wherein the plurality of sequential commands comprises instructions configured to cause the card reader to return dynamic transaction data comprising at least one second cryptogram generated with the simulated payment device;
    receiving, with at least one processor, a plurality of command responses generated by the simulated payment device based on the plurality of sequential commands, the plurality of command responses comprising the at least one second cryptogram;
    comparing, with at least one processor, the at least one second cryptogram to the at least one first cryptogram;
    matching, with at least one processor, the at least one second cryptogram to the at least one first cryptogram based on the comparing;

determining, with at least one processor, whether each command response of the plurality of command responses is a valid command response or an invalid command response based on matching the at least one second cryptogram to the at least one first cryptogram;

verifying, with at least one processor, the card image file based on determining that a predetermined number of command responses of the plurality of command responses are valid command responses;

automatically generating, with at least one processor, a report based on verifying the card image file, the report comprising a summary of the plurality of sequential commands and the plurality of command responses determined to be valid command responses; and automatically transmitting, with at least one processor, the report to a second computing device separate from the first computing device.

2. The computer-implemented method of claim 1, wherein generating the plurality of simulated payment transactions comprises identifying a subset of predefined payment transactions from a plurality of predefined payment transactions based on the card data.

3. The computer-implemented method of claim 1, wherein at least one command response of the plurality of command responses comprises dynamic card data, the dynamic card data comprising a digital signature generated by the payment device emulator.

4. The computer-implemented method of claim 1, wherein the card data comprises:
application data associated with at least one supported application;
supported transaction data associated with at least one supported transaction type; and
account data associated with a payment account.

5. A system, comprising:
a payment device emulator comprising a probe inserted into a card reader; and
at least one processor in communication with the payment device emulator, the at least one processor programmed or configured to:
parse a card image file to extract card data stored on the card image file, the card image file configured to be embedded on an integrated circuit of a payment card;
generate at least one first cryptogram based on the card data and at least one encryption key;
generate a plurality of simulated payment transactions based on the card data, each simulated payment transaction comprising simulated transaction data, wherein the simulated transaction data is generated via an emulation of a point of sale (POS) device, and wherein the emulation of the POS device receives at least the card data as an input and provides the simulated transaction data as an output;
generate transaction sequences comprising a plurality of sequential commands based on the simulated transaction data for the plurality of simulated payment transactions, wherein each of the plurality of sequential commands is associated with a discrete transaction of the plurality of simulated payment transactions;
communicate the plurality of sequential commands to the payment device emulator, the payment device emulator comprising a simulated payment device comprising the probe inserted into a card reader, wherein the probe is in communication with a first computing device that generates signals representative of a payment device and sends the signals to the payment device emulator via the probe, and wherein the plurality of sequential commands comprises instructions configured to cause the card reader to return dynamic transaction data comprising at least one second cryptogram generated with the simulated payment device;

receive a plurality of command responses generated by the simulated payment device based on the plurality of sequential commands, the plurality of command responses comprising the at least one second cryptogram;

compare the at least one second cryptogram to the at least one first cryptogram;

match the at least one second cryptogram to the at least one first cryptogram based on the comparing;

determine whether each command response of the plurality of command responses is a valid command response or an invalid command response based on matching the at least one second cryptogram to the at least one first cryptogram;

verify the card image file based on determining that a predetermined number of command responses of the plurality of command responses are valid command responses;

automatically generate a report based on verifying the card image file, the report comprising a summary of the plurality of sequential commands and the plurality of command responses determined to be valid command responses; and automatically transmit the report to a second computing device separate from the first computing device.

6. The system of claim 5, wherein the at least one processor generates the plurality of simulated payment transactions by identifying a subset of predefined payment transactions from a plurality of predefined payment transactions based on the card data.

7. The system of claim 5, wherein at least one command response of the plurality of command responses comprises dynamic card data, the dynamic card data comprising a digital signature generated by the payment device emulator.

8. The system of claim 5, wherein the card data comprises:
application data associated with at least one supported application;
supported transaction data associated with at least one supported transaction type; and
account data associated with a payment account.

9. A computer program product comprising at least one non-transitory computer-readable medium comprising one or more instructions that, when executed by at least one processor, cause the at least one processor to:
parse a card image file to extract card data stored on the card image file, the card image file configured to be embedded on an integrated circuit of a payment card;
generate at least one first cryptogram based on the card data and at least one encryption key;
generate a plurality of simulated payment transactions based on the card data, each simulated payment transaction comprising simulated transaction data, wherein the simulated transaction data is generated via an emulation of a point of sale (POS) device, and wherein the emulation of the POS device receives at least the card data as an input and provides the simulated transaction data as an output;
generate transaction sequences comprising a plurality of sequential commands based on the simulated transaction data for the plurality of simulated payment transactions, wherein each of the plurality of sequential commands is associated with a discrete transaction of the plurality of simulated payment transactions;

communicate the plurality of sequential commands to a payment device emulator, the payment device emulator comprising a simulated payment device comprising a probe inserted into a card reader, wherein the probe is in communication with a first computing device that generates signals representative of a payment device and sends the signals to the payment device emulator via the probe, and wherein the plurality of sequential commands comprises instructions configured to cause the card reader to return dynamic transaction data comprising at least one second cryptogram generated with the simulated payment device;

receive a plurality of command responses generated by the simulated payment device based on the plurality of sequential commands, the plurality of command responses comprising the at least one second cryptogram;

compare the at least one second cryptogram to the at least one first cryptogram;

match the at least one second cryptogram to the at least one first cryptogram based on the comparing;

determine whether each command response of the plurality of command responses is a valid command response or an invalid command response based on matching the at least one second cryptogram to the at least one first cryptogram;

verify the card image file based on determining that a predetermined number of command responses of the plurality of command responses are valid command responses;

automatically generate a report based on verifying the card image file, the report comprising a summary of the plurality of sequential commands and the plurality of command responses determined to be valid command responses; and automatically transmitting the report to a second computing device separate from the first computing device.

10. The computer program product of claim 9, wherein the at least one processor generates the plurality of simulated payment transactions by identifying a subset of predefined payment transactions from a plurality of predefined payment transactions based on the card data.

11. The computer program product of claim 9, wherein at least one command response of the plurality of command responses comprises dynamic card data, the dynamic card data comprising a digital signature generated by the payment device emulator.

12. The computer program product of claim 9, wherein the card data comprises:
application data associated with at least one supported application;
supported transaction data associated with at least one supported transaction type; and
account data associated with a payment account.

* * * * *